United States Patent
Londry et al.

(10) Patent No.: US 11,751,713 B2
(45) Date of Patent: Sep. 12, 2023

(54) METHOD FOR BREWING HOT BEVERAGES USING ULTRASOUND

(71) Applicant: Sonn Technology Ltd., Vancouver (CA)

(72) Inventors: Denis Londry, Burnaby (CA); Glen Poss, Nine Mile Falls, WA (US); Antonio Fernandez, Port Moody (CA); Stephen Chang, Coquitlam (CA)

(*) Notice: Subject to any disclaimer, the term of this patent is extended or adjusted under 35 U.S.C. 154(b) by 1055 days.

(21) Appl. No.: 16/351,503

(22) Filed: Mar. 12, 2019

(65) Prior Publication Data

US 2019/0274465 A1    Sep. 12, 2019

Related U.S. Application Data

(60) Provisional application No. 62/641,942, filed on Mar. 12, 2018.

(51) Int. Cl.
| | | |
|---|---|---|
| *A47J 31/00* | (2006.01) | |
| *A47J 31/50* | (2006.01) | |
| *A23L 5/30* | (2016.01) | |
| *A47J 31/52* | (2006.01) | |

(52) U.S. Cl.
CPC ............... *A47J 31/002* (2013.01); *A23L 5/32* (2016.08); *A47J 31/50* (2013.01); *A47J 31/521* (2018.08); *A23V 2002/00* (2013.01)

(58) Field of Classification Search
CPC ........ A47J 31/002; A47J 31/521; A47J 31/50; A23L 5/32; A23V 2002/00; C12H 1/16; C12H 1/165; C12H 1/22
USPC .... 99/275, 277, 277.1, 277.2, 280; 426/234, 426/238, 248, 322, 590, 592
See application file for complete search history.

(56) References Cited

U.S. PATENT DOCUMENTS

| | | | | |
|---|---|---|---|---|
| 2013/0189405 A1* | 7/2013 | Filliol | ............... | A47J 31/525 99/287 |
| 2014/0335242 A1* | 11/2014 | Huang | ............... | C12G 3/04 62/331 |
| 2017/0107467 A1* | 4/2017 | Bailey | ............... | C12H 1/16 |

* cited by examiner

*Primary Examiner* — Phuong T Nguyen
(74) *Attorney, Agent, or Firm* — JD Patent & Trademark Ltd.; Julian Forman

(57) ABSTRACT

The embodiment relates to the convenient amateur creation of a beverage where the extraction of flavor into a solvent is obtained using ultrasound. Where the solvent and solute are held in a removable carafe which has an ultrasound transducer. A control system will trigger ultrasound into the solvent for specific durations in order to quickly create the desired outcome. The use of one or more computers that will be able to implement a recipe, control the machine, and interact with the user ensure that the end user is able to operate the machine easily.

1 Claim, 2 Drawing Sheets

METHOD FOR BREWING HOT BEVERAGES USING ULTRASOUND

CROSS-REFERENCE TO RELATED APPLICATIONS

This application claims the benefit of U.S. Provisional Application No. 62/641,942 filed Mar. 12, 2018, the contents of which are hereby incorporated by reference in their entirety.

FIELD OF THE INVENTION

The present invention relates in to beverage preparation, and more particularly the creation of flavored solutions. Where a beverage consisting of one or more solvents and zero or more solutes is prepared in a carafe and then poured into a drinking vessel. The invention incorporates a carafe that can have ultrasound waves injected into the solvent that causes sonochemical reactions. Specifically, this invention relates to the control and application of ultrasound for lay users. The process may be used in a variety of manners with the requirements that a vessel has a controlled method for delivering ultrasound to a solvent within the vessel.

BACKGROUND OF THE INVENTION

Currently, non-industrial users that wish to extract flavors into solvent are limited to mixing solvent and solute before waiting for long period of times, or heating the above can degrade or eliminate certain desirable flavors. These techniques have been the common user's ability for millennia, they work but have significant side effects.

Slow extraction of flavors into a solution can have time lines of weeks or months depending on the products and temperatures that are being worked under. Cool brew coffee can take 48 h to brew properly, and the wood flavor extractions for spirits work in the order of years. This means that creation of certain beverages has remained in the domain of professionals or those that are able to spend long periods of time and allocate space to store the goods.

This means that there is a desire for home users to be able to reasonably create these types of products without the higher skills, times, and space.

Large scale industry has used ultrasound extraction to rapidly mix, extract and tune flavors for beverages. The downfall of this for small scale/home users has been that the equipment is very expensive and is designed to operate in continuous flow formats processing hundreds of liters per minute. This is far beyond the scope that any non-industrial plant can manage.

Ultrasound pulses injected into a solvent cause rarefaction and compression areas in a process called cavitation. The formation of these high-pressure zones causes neighboring partial vacuums, the high-pressure bubble will reach several thousand atmospheres of pressure instantaneously before collapsing. This rapid cycle many effects, but we are concerned with a few. Primarily this causes a great deal of molecular motion in the solvent, this catalyzes many reactions, also the introduction of significant power causes some weakly bonded molecules to break. The energy input into the solvent also causes trapped gases to be released, with fermented beverages sulphur dioxide is regularly trapped and the release of the gas causes the beverage to become less acidic as the trapped gases form sulphuric acid during an equilibrium reaction. Finally, solutes are subjected to significant surface pitting, this has a twofold effect as the pitting increases working surface area for chemical reactions as well as encouraging the dissolution of solids (total dissolved solids). While the use of ultrasound increases the speed of certain types of extraction and certain chemical reactions.

With the increasing use of ultrasound for cleaning tasks in such fields as medicine and manufacturing has dropped the cost of ultrasound transducers so that the key cost factor is now in the realm of a lay user.

While the basic tools are now available to lay users, the operation of these tools can have different effects depending on a large variety of factors. To accomplish this we provide a complete system that can manage all the factors and provide a simple method for home users to accomplish.

SUMMARY OF THE INVENTION

The current invention comprises a carafe with an ultrasound transducer set to emit with in the vessel, a base which is used to power and control the carafe, and a database of recipes.

A microcontroller in the base of the unit is used to implement recipes that are comprised of powering the transducer, wait states, and user interactions. A user is able to access recipes from a database stored on a computer and retrieved via internet access.

Users are then able to quickly create a vast array of beverages and potable liquids.

BRIEF DESCRIPTION OF DRAWINGS

The invention will be better understood according to the following detailed description of several embodiments with reference to the attached drawings, in which.

DETAILED DESCRIPTION OF THE INVENTION

Figure 1:
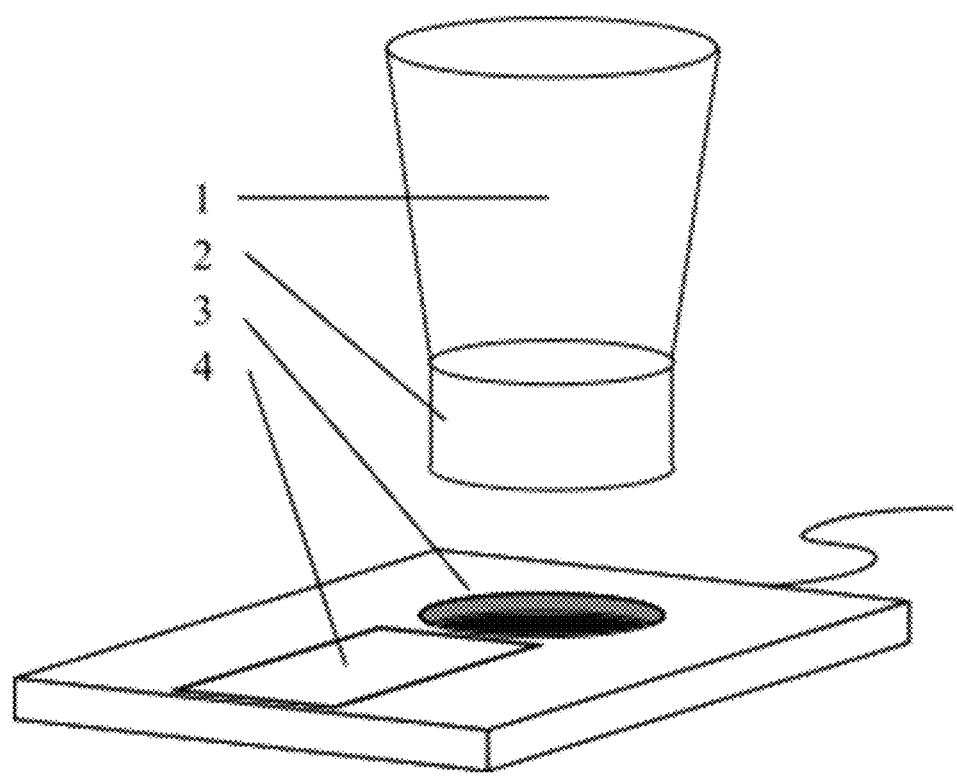
FIG. 1 presents the components of an ultrasound apparatus according to an embodiment of the present invention.

The core of the invention is the ultrasonic transducer attached to a carafe or vessel as shown in FIG. 1. The transducer 2 is actively controlled by a local microcontroller. When activated the ultrasound emitter causes super cavitation in the vessel 1 positioned in the socket or base unit 3, this effect rapidly extracts flavors into a solvent and catalyzes many reactions. Careful control of power cycles is done with millisecond levels of control as the catalysis acceleration can have perceptible effects below human control levels.

The invention therefore includes a significant human interface component 4 connected to a microcontroller so that a user can define a recipe. A recipe, in this instance, is defined as a set of power on, power off, waits, and user steps. Power is about turning the transducer on or off, waiting is allowing the carafe to sit before the next step. User steps are prompts for the client to do an activity like adding new ingredients.

A recipe is stored in a database, normally accessible via internet technology that is specific to the ingredients. The user may select a recipe manually via an application or may use a code that can lead and select a recipe. Users and database owners can adapt and update the recipe based on whatever information and algorithms they wish to apply.

Figure 2:
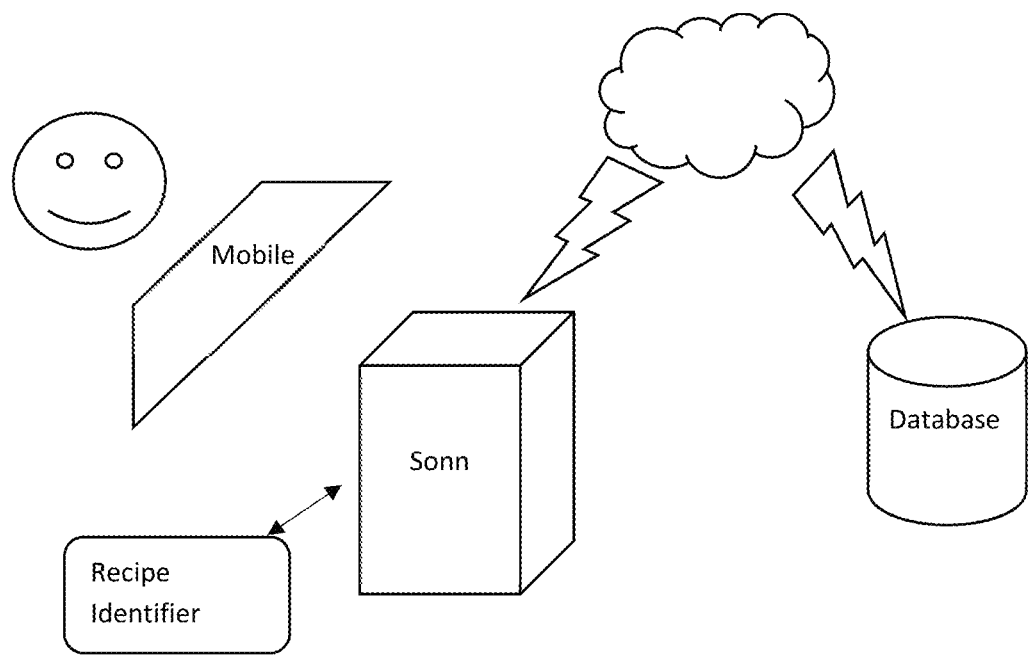
FIG. 2 presents a flow chart detailing the interaction of physical components with data sources according to an embodiment of the present invention.

The Recipe is then loaded onto the microcontroller and is run unto completion. This is detailed in FIG. 2.

The invention is most often used for beverages but a user knowledgeable in the art will understand that while we discuss beverages the invention is usable for any potable liquid. Soups, oils, marinades are clear choices but there are some applications such as lipid encapsulation of active medical ingredients (eg vitamins) that can be used with this technology.

The embodiment can have the various components enclosed in different enclosures without effecting the usage. While the initial embodiment has the human interface within the main enclosure, the Human interface may be accomplished using a user's computing device (mobile device.

What is claimed is:

1. An apparatus for the production of beverages using ultrasound comprising:
   a vessel including an ultrasound transducer located on a bottom thereof; and
   a base unit including a microcontroller;
   wherein the vessel is configured to be removed from or inserted into the base unit by a user;
   whereby the microcontroller is configured to receive human input selecting a desired beverage type, reference a database of beverage recipes to find the recipe comprising ultrasound parameters for the desired beverage type and control the ultrasound transducer according to the recipe for the desired beverage type by modulating the ultrasound parameters.

* * * * *